(12) United States Patent
Ernest

(10) Patent No.: US 11,789,342 B2
(45) Date of Patent: Oct. 17, 2023

(54) METHOD AND APPARATUS FOR PORTABLE LIGHTING

(71) Applicant: Paul Ernest, McKinney, TX (US)

(72) Inventor: Paul Ernest, McKinney, TX (US)

(*) Notice: Subject to any disclaimer, the term of this patent is extended or adjusted under 35 U.S.C. 154(b) by 0 days.

(21) Appl. No.: 18/161,422

(22) Filed: Jan. 30, 2023

(65) Prior Publication Data
US 2023/0251553 A1 Aug. 10, 2023

Related U.S. Application Data

(62) Division of application No. 17/647,329, filed on Jan. 6, 2022, now Pat. No. 11,567,394.

(60) Provisional application No. 63/253,475, filed on Oct. 7, 2021.

(51) Int. Cl.
*G03B 15/07* (2021.01)
*E06B 9/06* (2006.01)
*G03B 15/06* (2021.01)
*H04N 5/28* (2006.01)

(52) U.S. Cl.
CPC ............ *G03B 15/07* (2013.01); *G03B 15/06* (2013.01); *E06B 9/0638* (2013.01); *H04N 5/28* (2013.01)

(58) Field of Classification Search
CPC ....... G03B 15/06; G03B 15/07; E06B 9/0638; H04N 5/28
See application file for complete search history.

(56) References Cited

U.S. PATENT DOCUMENTS

| | | | |
|---|---|---|---|
| 2010/0296801 A1* | 11/2010 | Lane | G03B 17/53 396/2 |
| 2012/0147583 A1 | 6/2012 | Lai | |
| 2012/0262655 A1 | 10/2012 | Collias et al. | |
| 2020/0073206 A1 | 3/2020 | Fogarty | |
| 2023/0076734 A1* | 3/2023 | Ley | H04N 19/186 |

FOREIGN PATENT DOCUMENTS

| | | | | |
|---|---|---|---|---|
| CN | 103543576 A | * | 1/2014 | |
| CN | 105467719 A | * | 4/2016 | G03B 15/06 |
| CN | 216361902 U | * | 4/2022 | |
| WO | 2015137597 A1 | | 9/2015 | |
| WO | WO-2017051167 A1 | * | 3/2017 | G03B 15/00 |
| WO | WO-2018087781 A1 | * | 5/2018 | G03B 15/06 |

OTHER PUBLICATIONS

V-Flat World, https://vflatworld.com/pages/foldable-v-flats, 13 pgs.
(Continued)

*Primary Examiner* — Christopher E Mahoney

(57) ABSTRACT

Embodiments of the present disclosure provide adjustable lighting devices for use in photography lighting systems. In one embodiment, an adjustable lighting device comprises at least two panel sections and a light element. The at least two panel sections are each configured to act as a light reflector or flag, and are rotatably coupled to each other such that each panel section is freely rotatable relative to its one or more adjacent panel sections. The light element is coupled to one side of a first panel section of the panel sections, and configured to direct light substantially in a direction away from the one side of the first panel section.

2 Claims, 16 Drawing Sheets

(56) References Cited

OTHER PUBLICATIONS

FotodioX LED Studio-In-a-Box, https://web.archive.org/web/20200923105610/https://www.bhphotovideo.com/c/product/1265078-REG/fotodiox_studio_box_led440_16x16_led_studio_in_a_box_16_x.html Sep. 2020 (Year: 2020).
www.amazon.com/Zecti-Portable-Photography-Background-Brightness/dp/B088QZ4YP4/ref=asc_df_B088QZ4YP4/?tag=hyprod-20&linkCode=df0&hvadid=459520431986&hvpos=&hvnetw=g&hvrand=13818319489298927558&hvpone=&hvptwo=&hvqmt=&hvdev=c&hvdvcmdl=&hvlocint=&hvlocphy=1027289&hvtargid=pla-1007780164077&th=1 (Year 2020).

* cited by examiner

METHOD AND APPARATUS FOR PORTABLE LIGHTING

CROSS-REFERENCE TO RELATED APPLICATION(S) AND CLAIM OF PRIORITY

The application is a divisional of application Ser. No. 17/647,329 filed Jan. 6, 2022, now U.S. Pat. No. 11,567,394, which is based on and claims priority under 35 U.S.C. § 119(e) to U.S. Provisional Patent Application No. 63/253,475 filed on Oct. 7, 2021, which is hereby incorporated by reference in its entirety.

TECHNICAL FIELD

This disclosure relates generally to lighting for photography. Embodiments of this disclosure relate to devices that facilitate lighting a photography subject with studio quality lighting in a mobile environment, and methods of use thereof.

BACKGROUND

A photography studio environment allows photographers to exercise precise control over all factors in the environment that can affect the end product photograph. This includes the lighting of the subject, which is important in achieving a high-quality photograph. Many factors go into lighting the subject, including but not limited to the location of light sources relative to the subject, the color temperature of the light sources, the directionality or diffusion of light from the light sources, and the reflection of light from surfaces in the environment. Studio lighting equipment that allows for precise control of such factors is typically large and relatively immobile. As a result, lighting of photographic subjects outside of a dedicated photography studio must typically be done with less precise equipment, making it difficult if not impossible to achieve studio quality photographs.

SUMMARY

Embodiments of the present disclosure provide a method and an apparatus for facilitating lighting a photography subject with studio quality lighting in a mobile environment.

In one embodiment, a device is provided, comprising a plurality of panels and at least one lighting element. Each of the plurality of panels is rotatably coupled on at least one side to at least one other panel of the plurality of panels. A first end panel of the plurality of panels has the at least one lighting element coupled to one surface of the first end panel.

In another embodiment, an adjustable lighting device is provided, comprising at least two panel sections and a light element. The at least two panel sections are each configured to act as a light reflector or flag, and are rotatably coupled to each other such that each panel section is freely rotatable relative to its one or more adjacent panel sections. The light element is coupled to one side of a first panel section of the panel sections, and configured to direct light substantially in a direction away from the one side of the first panel section.

In another embodiment, a mobile photography studio is provided, comprising a subject area, a photographer area, and at least one adjustable lighting panel disposed between the subject area and the photographer area. The at least one adjustable lighting panel is configured to have an adjustable shape such that light is selectively blocked or reflected by the adjustable lighting panel. The at least one adjustable lighting panel further comprises at least one lighting element, and is further configured such that the lighting element can be rotated in at least one dimension to direct light in a desired direction within the mobile photography studio.

In another embodiment, a modular photography system is provided, comprising first and second compartments, a divider disposed between the first and second compartments, and first and second backlight arrays. The first compartment is configured to receive a subject to be photographed. The second compartment is adjacent the first compartment and configured to contain a camera. The first and second compartments share one pair of sidewalls. The divider includes first and second adjustable panels and first and second light arrays. The first adjustable panel is disposed on one of the pair of sidewalls and the second adjustable panel is disposed on the other of the pair of sidewalls, the first and second adjustable panels being movable with respect to their associated sidewall such that an edge of each of the first and second adjustable panels that is distal from the associated sidewall can move toward and away from an edge of the other of the first and second adjustable panels to create an adjustable opening therebetween, the adjustable opening being adjustable to block or reflect light that travels from the first compartment toward the camera when the subject is disposed in the first compartment. The first and second light arrays are disposed on the edges of the first and second adjustable panels, respectively, proximate the adjustable opening and directed toward the first compartment, such that the first and second light arrays illuminate the subject when the subject is disposed in the first compartment. The first and second backlight arrays are disposed in the first compartment distal from the adjustable opening adjacent opposite ones on the adjacent sidewalls.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that studio lighting equipment is typically large, bulky, and relatively difficult to move. Such equipment is designed to provide the most precise possible control over the lighting of an environment, and mobility is not much of a concern in the studio. Protecting against accidental movement of the lighting equipment can even be considered beneficial. However, moving studio lighting equipment to a different location is difficult in most circumstances. Additionally, studio lighting equipment can be power hungry, as it is designed with the expectation that it will be used near easily accessible electric outlets inside a studio.

Embodiments of the present disclosure further recognize that there are some cases where a person may desire to have a studio quality photograph taken of them, but it may be inconvenient to schedule an appointment and travel to a photographer's studio. By the same token, a photographer may desire to travel to the location of potential customers and offer to take studio quality photographs of customers on immediately and at their location. However, without access to studio lighting equipment, it can be difficult and time consuming for the photographer to take high quality studio-style photographs of a subject outside of the studio.

Accordingly, embodiments of the present disclosure provide a lighting apparatus that can provide a level of control over the lighting of a subject that is comparable to a standard studio lighting arrangement. Embodiments of the present disclosure also provide a mobile studio in which the lighting apparatus may be used. The mobile studio environment is transportable by a single person using, for example, a trailer that can be hauled by a standard consumer class vehicle.

Figure 1A:
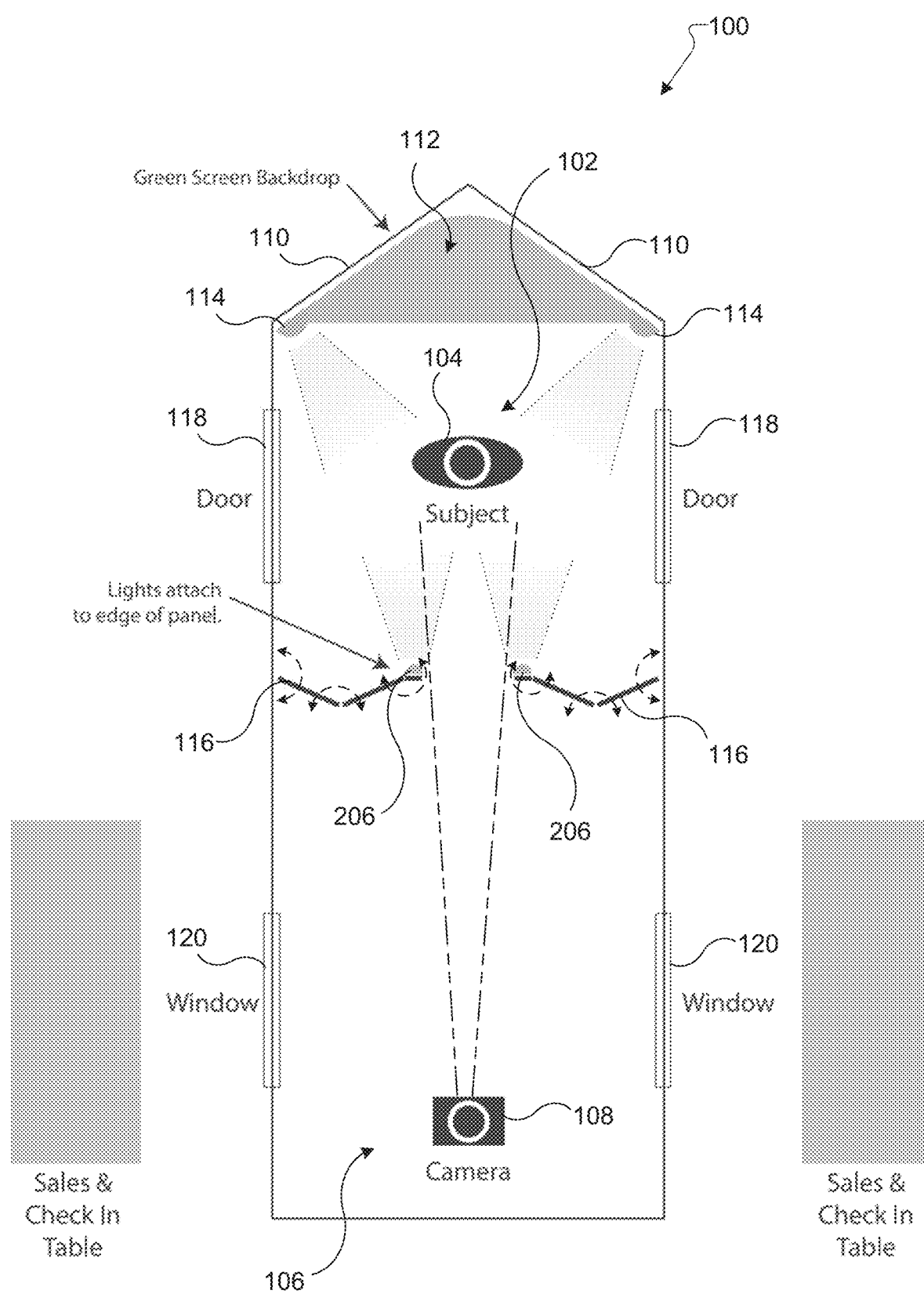
FIG. 1A illustrates a top-down plan perspective of an example mobile studio according to various embodiments of the present disclosure.
Figure 1B:
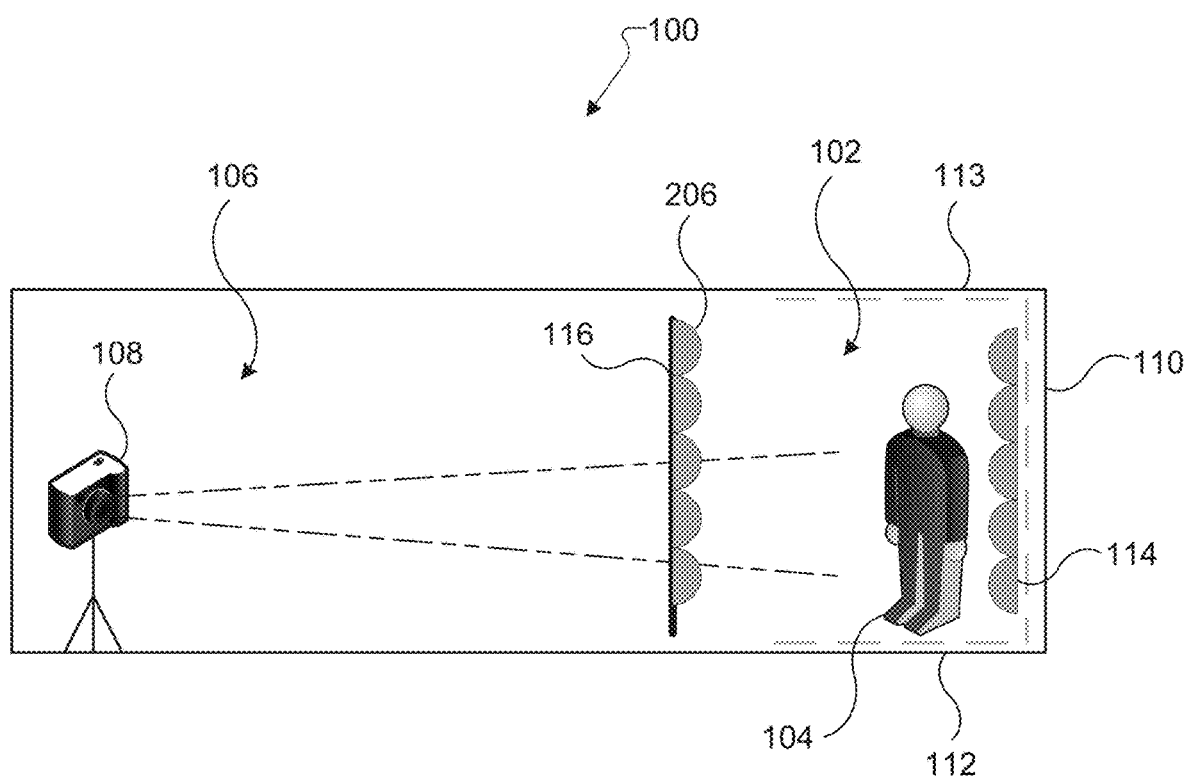
FIG. 1B illustrates a side perspective of the example mobile studio of FIG. 1A.

FIG. 1A illustrates a top-down plan perspective of an example mobile studio 100 according to various embodiments of the present disclosure. FIG. 1B illustrates a side perspective of the example mobile studio 100 of FIG. 1A. The mobile studio 100 includes a subject area 102, in which a photography subject 104 is situated, and a photographer area 106, in which the camera 108 is located with line-of-sight to the subject 104. In some embodiments there is room in the photographer area 106 for the photographer to manually operate the camera 108 while maintaining the necessary distance from the subject 104, while in other embodiments the camera 108 may be remotely operated, thus allowing the size of the studio to be decreased while still maintaining the necessary distance from the subject 104. The camera 108 may be height-adjustable, and may be positioned in any suitable location in the photographer area 106 to achieve the desired framing of the subject 104.

In some embodiments, the subject area 102 may be configured such that it is partially or entirely painted (or colored in any suitable way) in a single color for the purpose of chroma keying. For example, the wall 110 of the subject area 102 of the mobile studio 100 that is behind the subject 104 (relative to the camera 108) may be colored for chroma keying. Additionally, the floor 112 and ceiling 113 (illustrated in FIG. 1B) of the subject area 102 may be partially or entirely colored to match the wall 110 for chroma keying. In this way, a photograph of the subject 104 can be taken in the mobile studio 100 and any desired background may be added for the final photograph. In some embodiments, portions of the subject area 102 that are not colored for chroma keying may be colored white (or another light color) to reflect light.

In some embodiments, the mobile studio 100 is configured to photograph subjects 104 that are located in a predetermined position within the subject area 102 (for example, in the center of the subject area 102). This allows for lighting of the subject area 102 to be at least partially pre-configured for any subject 104. For example, lighting elements may be located behind the subject 104 to facilitate backlighting of the subject 104 and of the subject area 102 more generally, and such lighting may be fixedly attached to a wall or ceiling of the mobile studio 100 while still being situated appropriately to backlight any subject 104. These lighting elements may be referred to as backlighting elements 114. The backlighting elements 114 may be comprised of an array of lighting elements (e.g., a linear array of light emitting diode (LED) lighting elements), which may be configured so that the array may be partially lit. In some embodiments, some of the backlighting elements 114 may be directed towards the subject 104 (e.g., directed towards the center of the subject area 102), and some of the backlighting elements 114 may be directed towards the wall 110 of the subject area 102. This may facilitate even lighting from behind the subject 104 while avoiding lens flare at the camera 108.

In various embodiments, one or more adjustable light panels 116 may be located in the area between the subject 104 and the camera 108. These adjustable light panels 116 facilitate a wide range of frontal studio lighting conditions of the subject 104, as will be described in further detail below. The adjustable light panels 116 may be configured to be easily adjustable in real time, e.g., between each photograph, or between different subjects 104. As will be described further below, the adjustable light panels 116 may also function as reflectors or as flags to block light.

In some embodiments, the adjustable light panels 116 are movably attached to the walls, floor, or ceiling of the mobile studio 100. For example, in the example illustrated in FIG. 1, two adjustable light panels 116 are provided, and each is attached to a wall of the mobile studio 100 by a hinge. The adjustable light panels 116 may be configured to stow away against the walls to allow for ease of movement between the subject area 102 and the photographer area 106, and may be configured to lock in position to prevent unintended movement while the mobile studio 100 is in motion (e.g., while the mobile studio 100 is being hauled behind a vehicle). In other embodiments, the adjustable light panels 116 may not be attached to the mobile studio 100, and may instead be freely movable within the mobile studio 100, and removable from the mobile studio 100. In some embodiments, the adjustable light panels 116 are configured such that an opening between the adjustable light panels 116 is sufficient for the camera 108 in the photographer area 106 to frame the subject 104 without the adjustable light panels 116 entering the field of view of the camera 108. As the adjustable light panels 116 can be adjusted, the opening between the two adjustable light panels 116 is itself adjustable. In this manner, the adjustable light panels 116, via the adjustable opening, are operable to prevent unwanted light from being reflected from the subject area 102 into the photographer area 106. Additionally, the camera 108 may be moved closer to or farther away from the subject 104, and the adjustable light panels 116 can be adjusted to vary the size of the adjustable opening as needed to reframe the subject 104 with the desired lighting reflected from the subject area 102. The separation of the subject area 102 from the photographer area 106 can be considered to divide the mobile studio 100 into two compartments that correspond to the subject area 102 and the photographer area 106, respectively.

In the illustrated embodiments the mobile studio 100 is in the form factor of a trailer that can be hauled by a standard consumer class vehicle, but it is understood that any other suitable form factor could be used. For example, the studio could be decreased in size so long as there is room to allow sufficient distance between the camera 108 and the subject 104 to achieve the desired photograph, or the studio could be increased in size so long as it is still transportable. The studio could also be integrated into a vehicle (e.g., a recreational vehicle).

In some embodiments, a pair of doors 118 are provided on either side of the subject area 102. This facilitates a one-way flow of subjects 104 through the subject area 102. For example, in a case where a large number of subjects 104 are queued up to have photographs taken (e.g., an athletic team, a group of coworkers, a class of students, etc.), this arrangement facilitates efficient movement into the mobile studio 100 from one side and out of the mobile studio 100 from the opposite side. In combination with the lighting features of the mobile studio 100 described herein, this allows for high quality studio-style photographs of a large number of subjects 104 to be rapidly taken.

In some embodiments, a pair of windows 120 are provided on either side of the photographer area 106. These windows 120 may allow for communication between the photographer (or an assistant) inside the mobile studio 100 and subjects 104 outside the mobile studio 100. For example, in the above-discussed scenario involving a large number of subjects 104 that are queued up to have photographs taken, the windows 120 may facilitate checking the subjects 104 in or signing the subjects 104 up to have their photographs taken, including obtaining personal information, payment information, desired customization options, etc. of each subject 104. In conjunction with the pair of doors 118 in the subject area 102, the pair of windows 120 may further facilitate rapid processing of a large number of subjects 104 through any suitable back-end system that the photographer may use to organize and bill customers for photography services.

In various embodiments, the windows 120 may be configured to be completely sealable to prevent exterior light from entering the mobile studio 100 while photographs are being taken. In other embodiments, the windows 120 may be separated from the subject area 102 by an additional divider that allows communication through the window 120 while preventing light that enters the window 120 from impacting the lighting in the subject area 102.

In various embodiments, the photographer area is configured to be completely darkened while taking photographs of the subject 104, such that the subject 104 is only lit by the backlighting elements and the adjustable light panels 116. In this way, the lighting of the subject 104 can be precisely controlled within the mobile studio 100. Since the mobile studio 100 itself can be transported to any environment, this advantageous lighting control can be accessed in any location regardless of the exterior conditions.

Although FIGS. 1A-1B illustrate one example of a mobile studio 100, various changes may be made to FIGS. 1A-1B. For example, various components in FIGS. 1A-1B could be combined or omitted and additional components could be added according to particular needs.

Figure 2A:
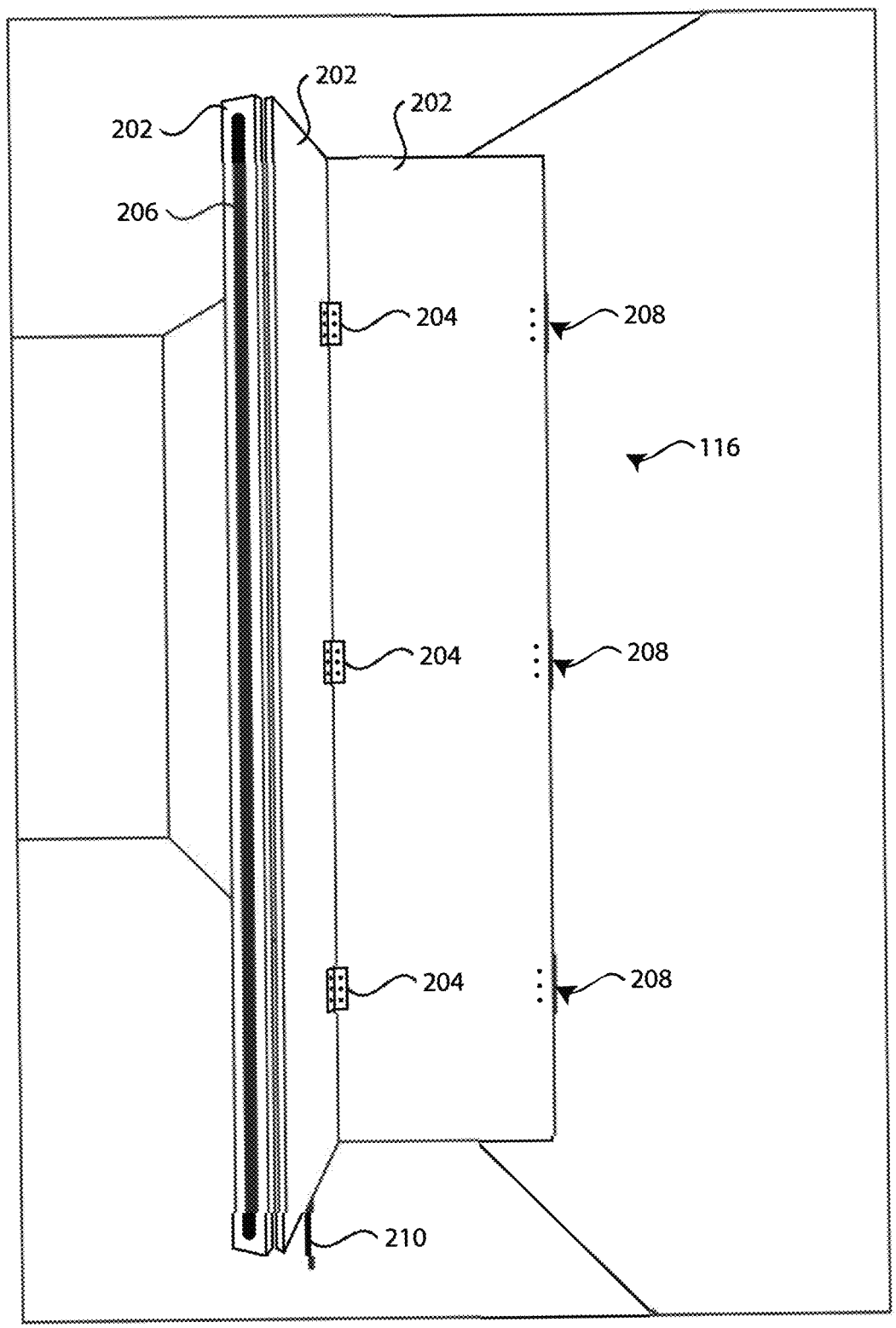
FIGS. 2A-2C illustrate an example adjustable light panel according to embodiments of the present disclosure.
Figure 2B:
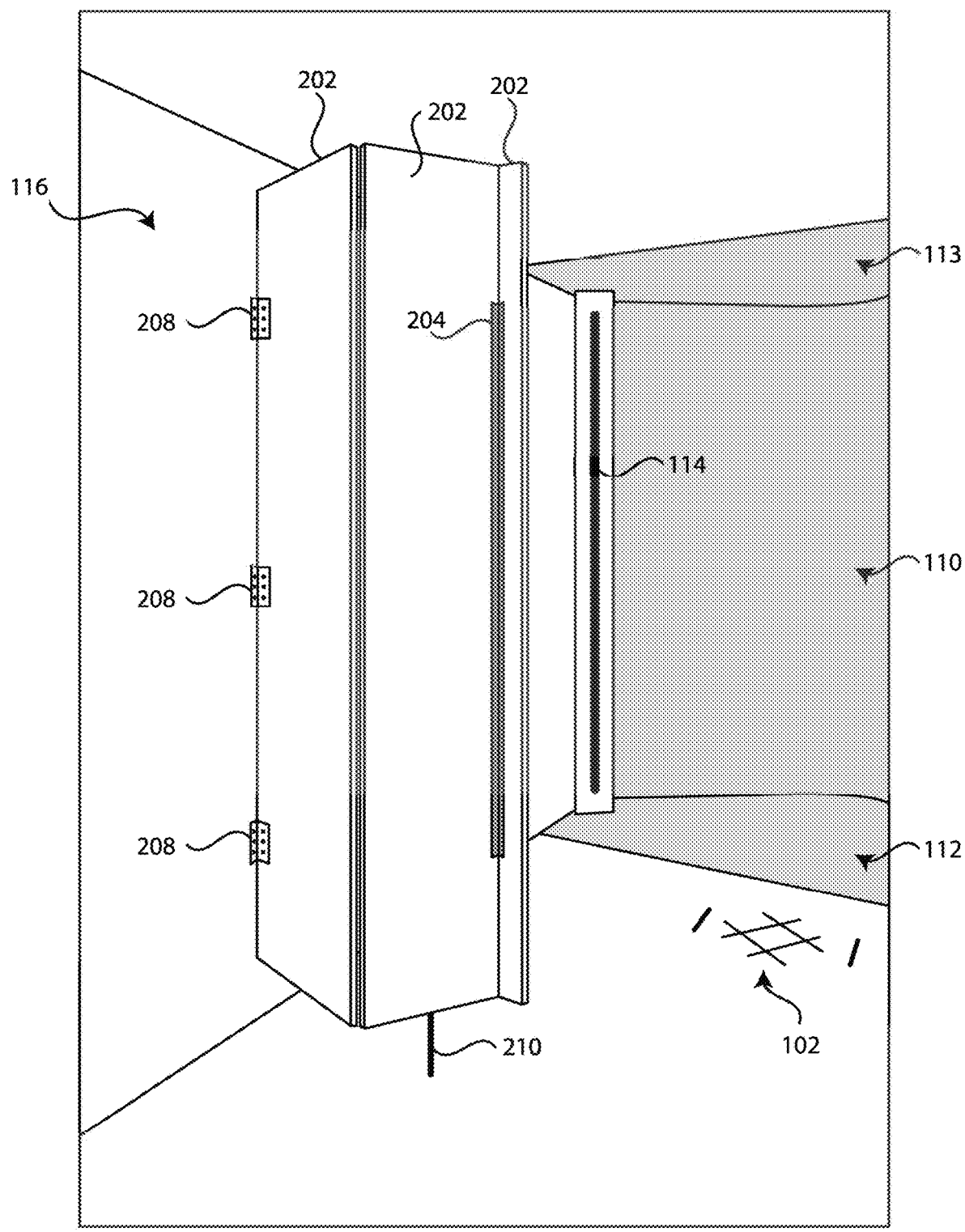
Figure 2C:
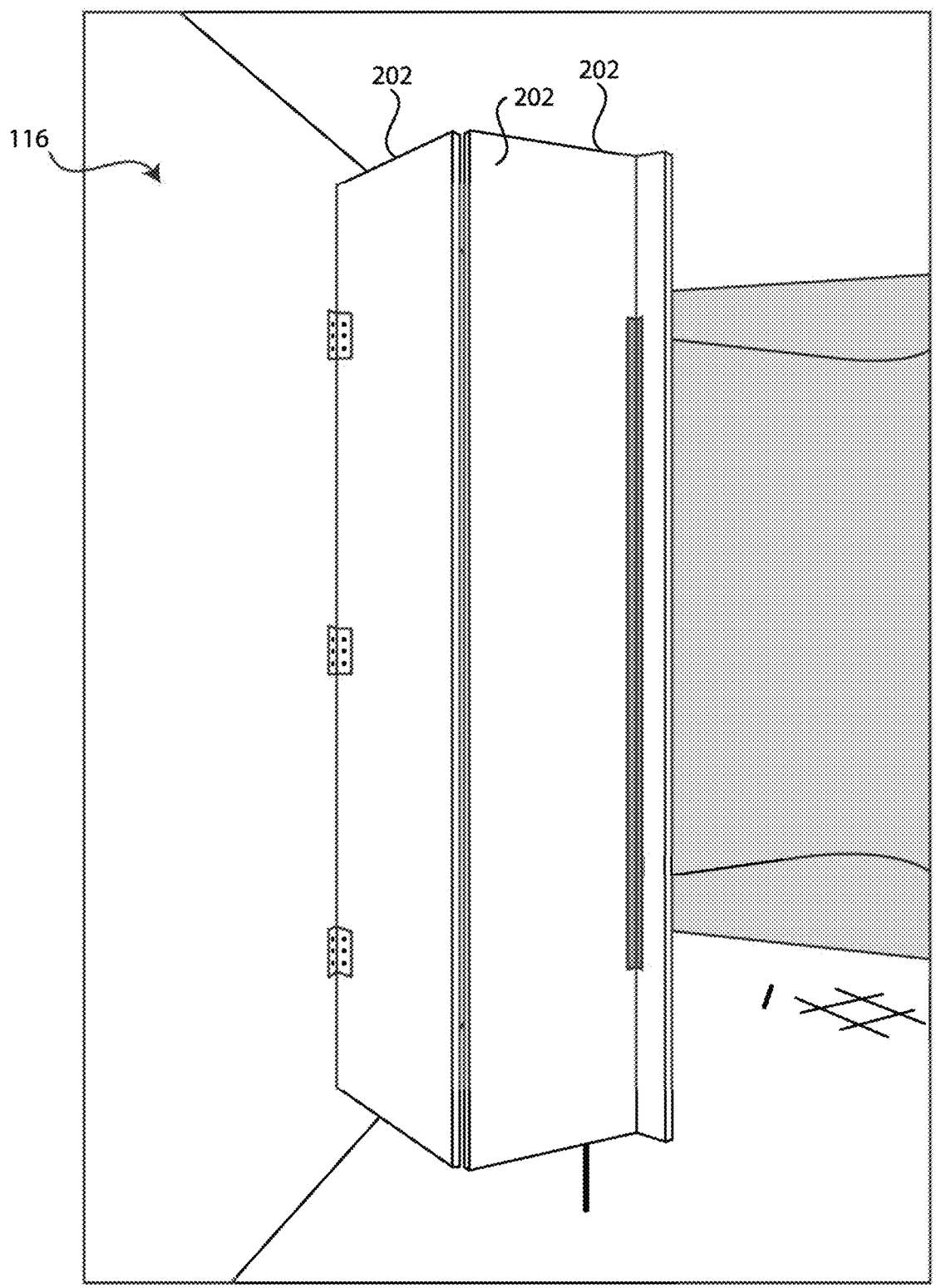

FIGS. 2A-2C illustrate an example adjustable light panel 116 according to embodiments of the present disclosure. For the purposes of this disclosure, the adjustable light panel 116 will be discussed in the context of the example mobile studio 100 of FIG. 1, but it is understood that the adjustable light panel 116 could be used separately from the mobile studio 100, in any other suitable environment.

In some embodiments, the adjustable light panel 116 is comprised of three or more sections (or sub-panels) 202 that are each coupled to the adjacent section 202 by hinges 204. In this way, the adjustable light panel 116 can be articulated, and each section 202 can be independently angled relative to the other sections 202. In some embodiments, the hinges between sections 202 can alternate direction such that the adjustable light panel 116 is articulated in an accordion-like fashion. In such embodiments, the sections 202 of the adjustable light panel 116 can be folded up completely for storage or transportation in a compact fashion, and can be unfolded and arranged to function as reflectors or flags, depending on the location of light sources. The hinges used to couple adjacent sections 202 may be configured to lock in place at one or more angles, thus allowing the sections 202 to be fixed in a desired orientation and resilient to accidental movement (e.g., due to accidental contact by a person, due to air flow caused by a fan, etc.). It is understood that any suitable coupling means may be used to couple sections 202 of the adjustable light panel. For example, a pliable coupler comprised of, e.g., rubber could be used in place of a hinge.

FIG. 2B illustrates an example of the camera's point of view in a scenario wherein an adjustable light panel 116 is arranged such that a background light in the subject area 102 of the mobile studio 100 is visible to the camera 108. FIG. 2C illustrates an example of the camera's point of view in a scenario wherein the adjustable light panel 116 is arranged to act as a flag, blocking the background light in the subject area 102 of the mobile studio 100 from the camera 108. Additionally, in both of these scenarios, one or more of the sections 202 of the adjustable light panel 116 may be coated in a reflective material (e.g., white paint or any other suitable pigmented coating) on at least one side, e.g., the side facing the subject area 102, and may also act as reflectors for the light produced in the subject area 102 (e.g., the background light or light produced by the adjustable light panel 116 itself as will be discussed below, by another adjustable light panel 116, or by any other light source).

In other embodiments, one or more of the sections 202 of the adjustable light panel 116 may be coated in an absorptive material (e.g., black paint or any other suitable pigmented coating) on at least one side, to prevent reflection of light. For example, one or more of the sections 202 of the adjustable light panel 116 that face the photographer area may be coated in black to absorb light, and thus prevent reflection of light from the photographer area into the camera 108.

In yet other embodiments, one or more of the sections 202 of the adjustable light panel 116 may be provided with a variable coating that can be adjusted between reflective and absorptive states. For example, the sections 202 could be coated in a light-colored (i.e., reflective) pigment and covered with an array of liquid crystals, which may be configured to vary between opaque and transmissive states based on an input, thus allowing control between the opaque (absorptive) state and the transmissive (reflective) state.

One or more of the sections 202 of the adjustable light panel 116 may have a light (or light array) 206 attached to one side. For example, in the embodiment of FIG. 2A, an LED light array 206 is attached along the length one of the end-most sections 202. In the embodiments of FIGS. 1A-2C, the LED light array 206 is on the side of the adjustable light panel 116 that is generally directed towards the subject area 102. By adjusting the angle of the section 202 including the light, the angle of light cast on the subject 104 can be adjusted as the photographer desires. Depending on the environment where the adjustable light panel 116 is used, the section 202 including the light can also adjusted to provide indirect light, for example by directing the light at another reflector (e.g., a wall of the mobile studio 100 in FIGS. 1A-2C that is colored with a white pigment), or by directing the light at another section 202 of the adjustable light panel 116 that acts as a reflector. In some embodiments, the light array may be configured such that the array can be partially lit, allowing further control of the lighting of the subject 104.

The section 202 to which the LED light array 206 is attached can, in some embodiments, be configured to rotate (or swivel) with respect to the rest of the adjustable light panel 116. In this manner, the LED light array 206 can be rotated (or swiveled) about an axis parallel to the plane of the floor of the mobile studio to adjust the angle of light that is directed towards the subject 104. In other embodiments, the section 202 to which the LED light array 206 is attached can be configured to both rotate around an axis perpendicular to the floor of the mobile studio and swivel about an axis parallel to the floor. By being able to adjust the angle of the LED light array 206 independent of the configuration of the adjustable light panels 116, a large range of illumination of the subject 104 can be achieved.

In some embodiments, the section 202 that includes the light array is narrower than the other sections 202 of the adjustable light panel. For example, the section 202 may be designed to be substantially the same dimensions as the light array itself, as illustrated in FIG. 2A. This allows the section 202 including the light to be articulated to adjust the angle of the light while having minimal impact on the function of the rest of the adjustable light panel 116 as a reflector or flag. For example, in FIG. 2C, the end-most section 202 includes a light array on the reverse side, and the section 202 can be fully articulated without the background light in the subject area 102 being made visible to the camera 108. In this way, the adjustable light panel 116 continues to function as a flag for the background light regardless of the angle of the end-most section 202 of the adjustable light panel 116 that includes the LED light array 206. Similarly, in FIG. 2B, the end-most section 202 can be fully articulated without obstructing the background light.

The adjustable light panel 116 may include various feet or other attachment points to support the adjustable light panel. For example, in FIGS. 2A-2C, an end-most section 202 of the adjustable light panel 116 (that is opposite the end-most section 202 including the light array) attaches to a wall of the mobile studio 100 with hinges 208 that allow the angle of this end-most section 202 to be adjusted relative to the wall. The adjustable light panel 116 further includes one or more feet 210 that extend from the bottom of one or more sections 202 of the adjustable light panel 116 towards the floor of the mobile studio 100. For example, each section 202 could have its own feet 210. The feet 210 may include a tip that is configured to provide friction with a contacting surface (such as the floor) in order to hold the section 202 in place and prevent the section 202 from being accidentally moved. In other embodiments, the floor of the mobile studio 100 could be designed with a number of recesses or grooves to receive the feet 210 of the adjustable light panel 116 in predetermined positions. Such an arrangement could provide stronger resilience against accidental movement.

In yet other embodiments, the adjustable light panels 116 may not include attachment points for attachment to the walls from the side of some of the end-most sections 202, but may instead include additional feet 210 that are configured to support the adjustable light panel 116 in a freestanding arrangement (e.g., bipod or tripod-style feet configured to support the adjustable light panel 116 on any surface, or feet configured to be inserted within recesses in a floor in predetermined locations). Such adjustable light panels 116 may be used in any environment (i.e., not only in the mobile studio 100). For example, the adjustable light panels 116 may be used in a traditional photography studio (e.g., when a photographer is using a shared studio space to which they must bring their own equipment), or in any other suitable location, such as an indoor venue that is temporarily set up as a photography studio.

In some embodiments, particular angles of the hinges that couple the sections 202 of the adjustable light panel 116 together may be labeled and assigned a designation to facilitate creation of easily reproducible configurations of the adjustable light panel. Foot locations for one or more of the sections 202 of the adjustable light panel 116 within the mobile studio 100 may similarly be labeled and assigned a designation to facilitate creation of easily reproducible configurations of the adjustable light panel 116 within the mobile studio 100. For example, a photographer could determine a particular configuration of one or more adjustable light panels 116 within a particular mobile studio that produces a desired result, and could then provide another person with a set of designated angles of the sections 202 of the adjustable light panels 116 and a set of designated foot locations for the sections 202 so that the other person can recreate the same lighting conditions in the mobile studio 100 in the future. In some embodiments, an adjustable light panel 116 can additionally include motor-actuated hinges (and motor-actuated feet) that can be programmed to actuate the hinges to move the sections 202 of the adjustable light panel 116 to a pre-set configuration.

Although FIGS. 2A-2C illustrate one example of an adjustable light panel, various changes may be made to FIGS. 2A-2C. For example, the adjustable light panel 116 could include any number of additional sections 202. Furthermore, the sections 202 could be different in size from each other.

Figure 3A:
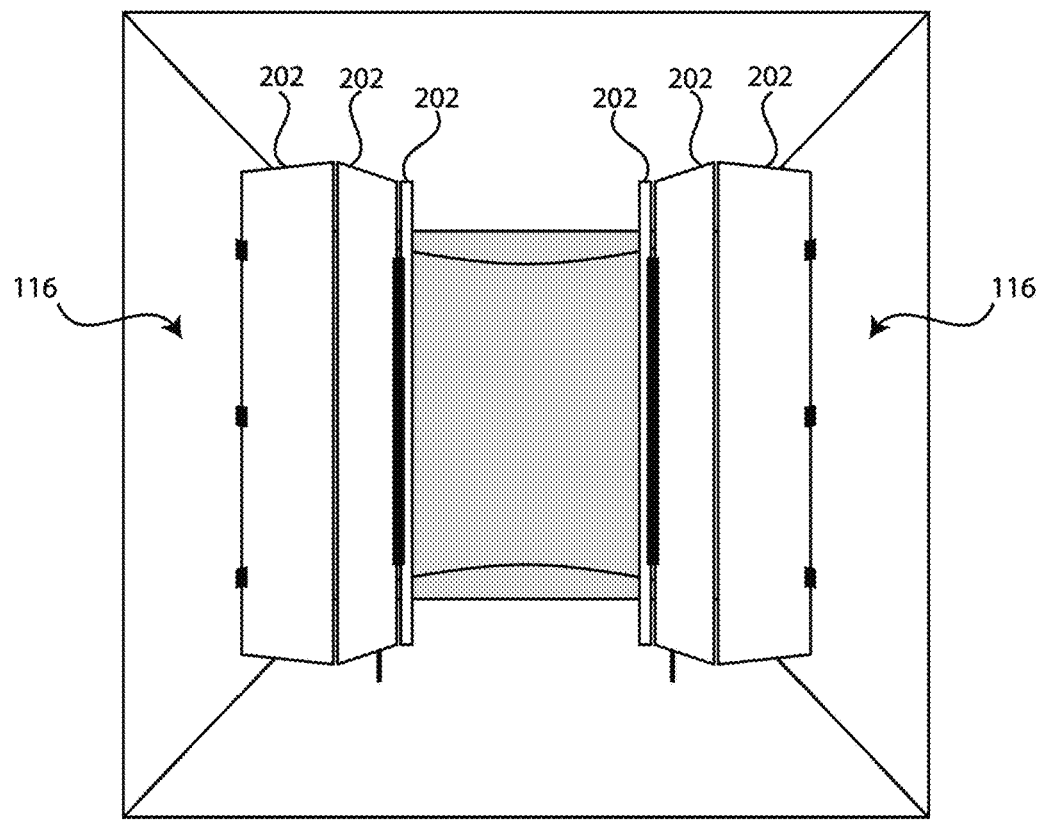
FIGS. 3A-3B illustrate an example mobile studio including two adjustable light panels according to embodiments of the present disclosure.
Figure 3B:
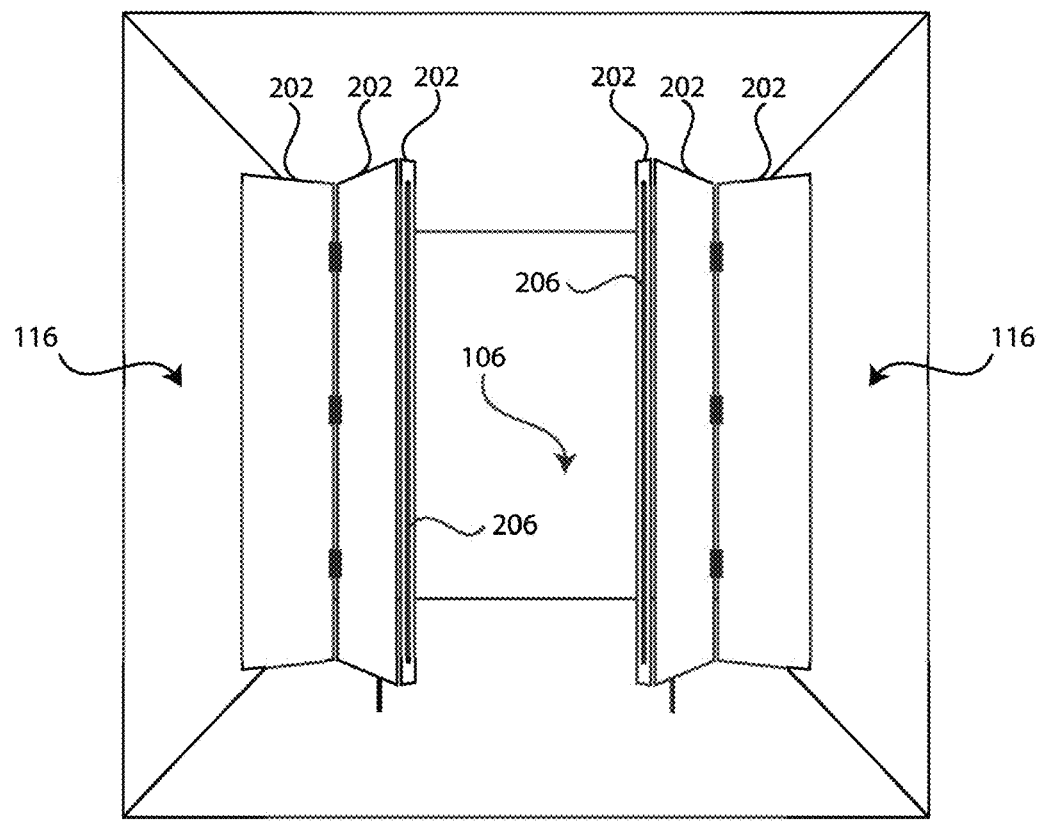

FIGS. 3A-3B illustrate an example mobile studio including two adjustable light panels 116 according to embodiments of the present disclosure. For the purposes of this disclosure, the mobile studio will be discussed as the example mobile studio 100 of FIGS. 1A-1B, but it is understood that the adjustable light panels 116 could be used separately from the mobile studio 100 in any other suitable environment, or the mobile studio 100 could be any other suitable mobile studio.

FIG. 3A illustrates a view from the perspective of the camera 108 location within the photographer area 106 of the mobile studio 100. FIG. 3B illustrates a view from the perspective of the subject 104 location within the subject area 102 of the mobile studio 100.

In this embodiment, each of the two adjustable light panels 116 is attached to an opposite wall of the interior of the mobile studio 100 in the configuration of FIG. 1A, such that the two adjustable light panels 116 are disposed between the subject area 102 and the photographer area 104. The use of two adjustable light panels 116 as discussed herein above, in conjunction with two backlighting panels 114 (e.g., as illustrated in FIGS. 1A-1B and FIGS. 4A-4C), may provide the photographer with precise control of the lighting conditions of the subject 104 from all angles.

Figure 4A:
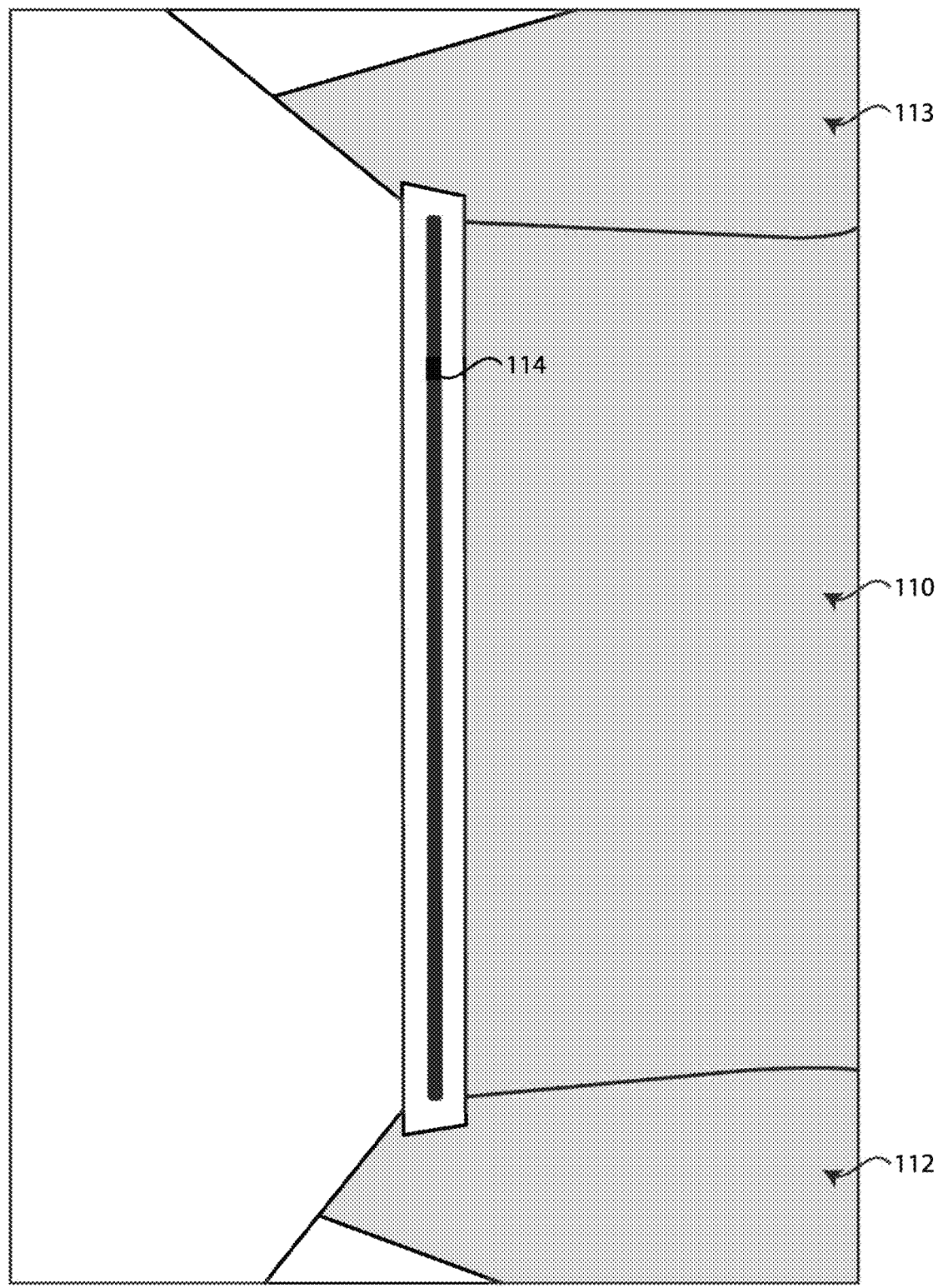
FIGS. 4A-4C illustrate backlights in an example mobile studio according to embodiments of the present disclosure.
Figure 4B:
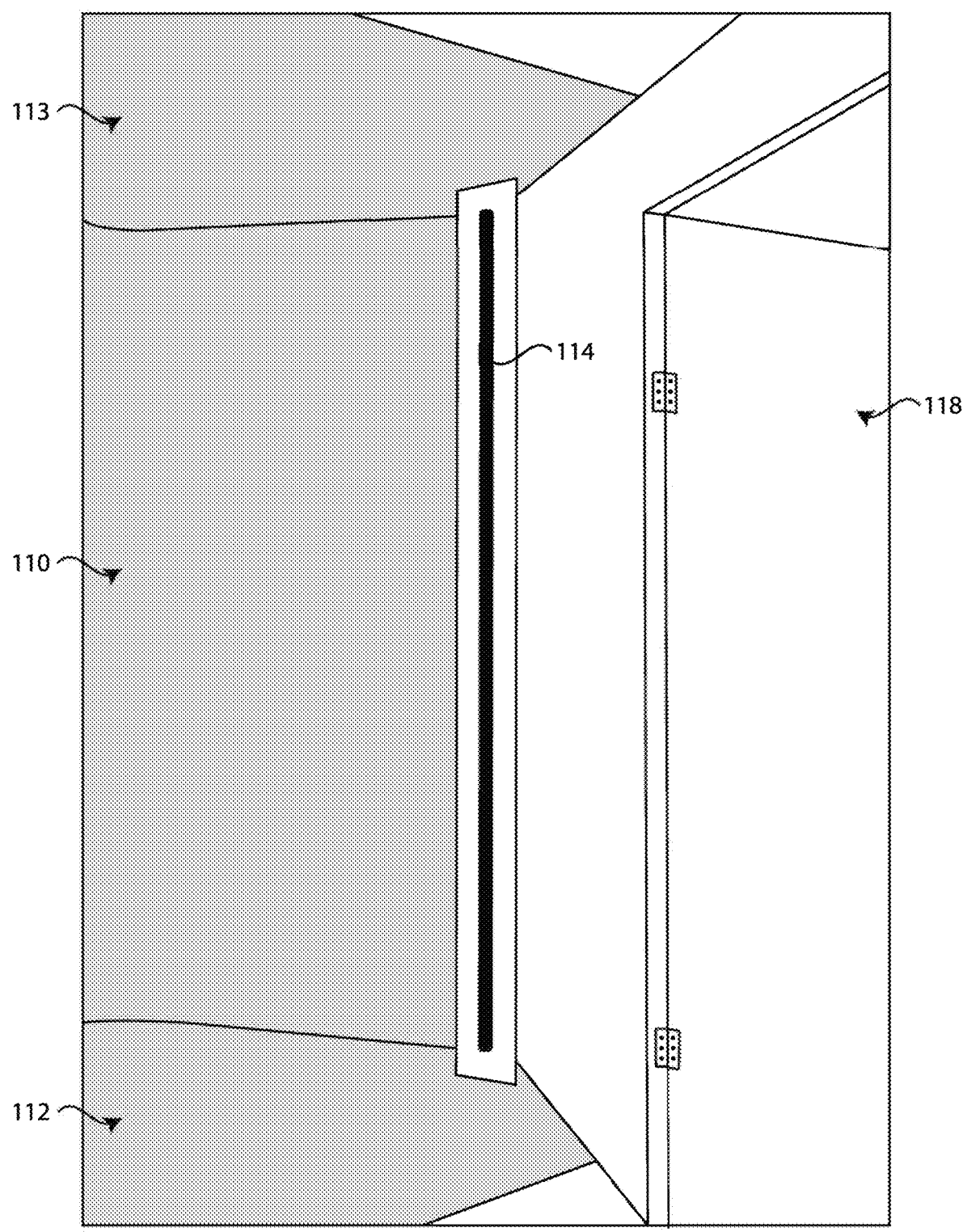
Figure 4C:
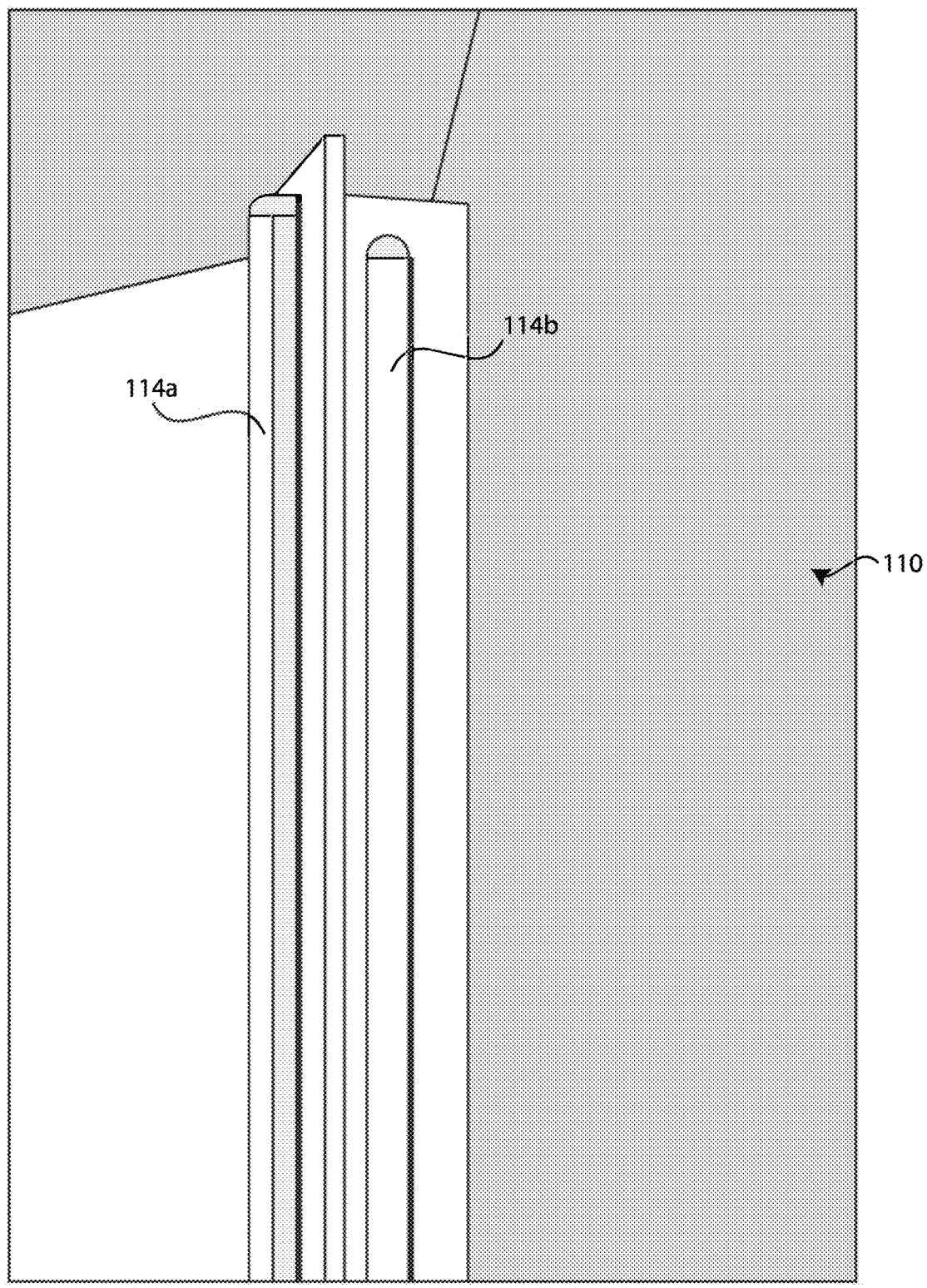

FIGS. 4A-4C illustrate backlights 114 in an example mobile studio according to embodiments of the present disclosure. For the purposes of this disclosure, the mobile studio will be discussed as the example mobile studio 100 of FIG. 1A. FIGS. 4A-4C illustrate backlights 114 in the subject area 102 of the mobile studio 100. For example, the backlights 114 illustrated in FIGS. 4A-4C may correspond to the backlights 114 in the subject area 102 of the mobile studio 100 in FIG. 1A. Some of the backlights 114 may be directed towards the subject 104 (e.g., towards the center of the subject area 102) as illustrated in FIGS. 4A-4B, and some of the backlights 114 may be directed towards the wall 110 of the subject area 102 as illustrated in FIG. 4C. In FIG. 4C, backlight 114a faces towards the center of the subject area 102, and backlight 114b faces towards the wall 110 of the subject area 102. Backlight 114b in FIG. 4C may correspond to the backlights 114 that are illustrated in FIGS. 4A-4B.

In some embodiments, the backlights 114 may be configured as a substantially linear array or lights that is disposed in a vertical direction relative to the mobile studio 100. The backlights 114 can be fixed or they can be rotatable relative to the plane of the wall of the mobile studio 100.

Although FIGS. 4A-4C illustrate one example of backlights 114 in a mobile studio 100, various changes may be made to FIGS. 4A-4C. For example, the backlights 114 could be divided into any number of smaller lighting arrays.

Figure 5A:
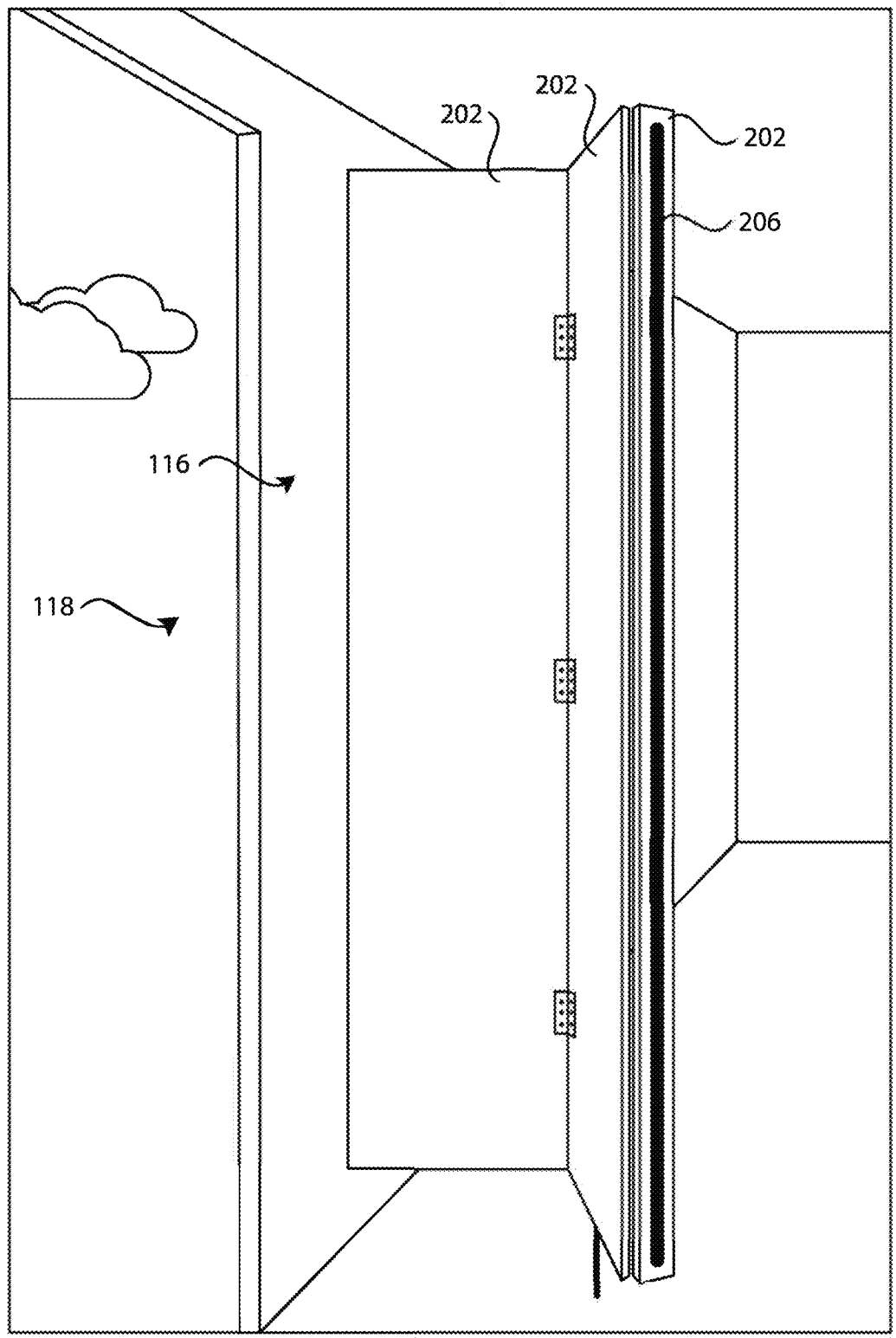
FIGS. 5A-5B illustrate perspectives of an interior of an example mobile studio according to embodiments of the present disclosure.
Figure 5B:
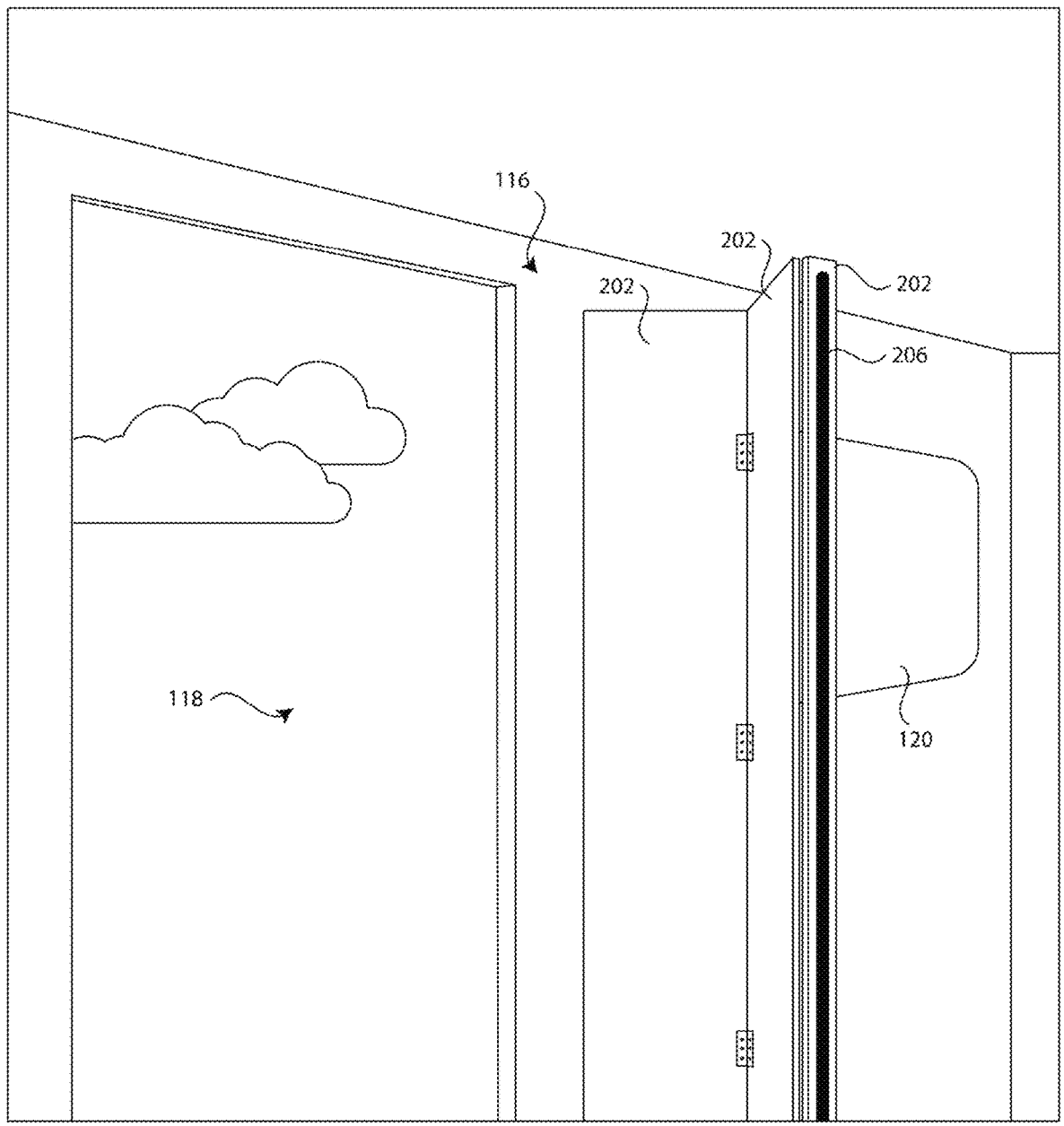

FIGS. 5A-5B illustrate perspectives of an interior of an example mobile studio according to embodiments of the present disclosure. For the purposes of this disclosure, the mobile studio will be discussed as the example mobile studio 100 of FIG. 1A. FIGS. 5A-5B illustrate views from the perspective of the subject 104 location within the subject area 102 of the mobile studio 100, looking towards one of the doors 118 provided on the sides of the subject area 102.

Figure 6:
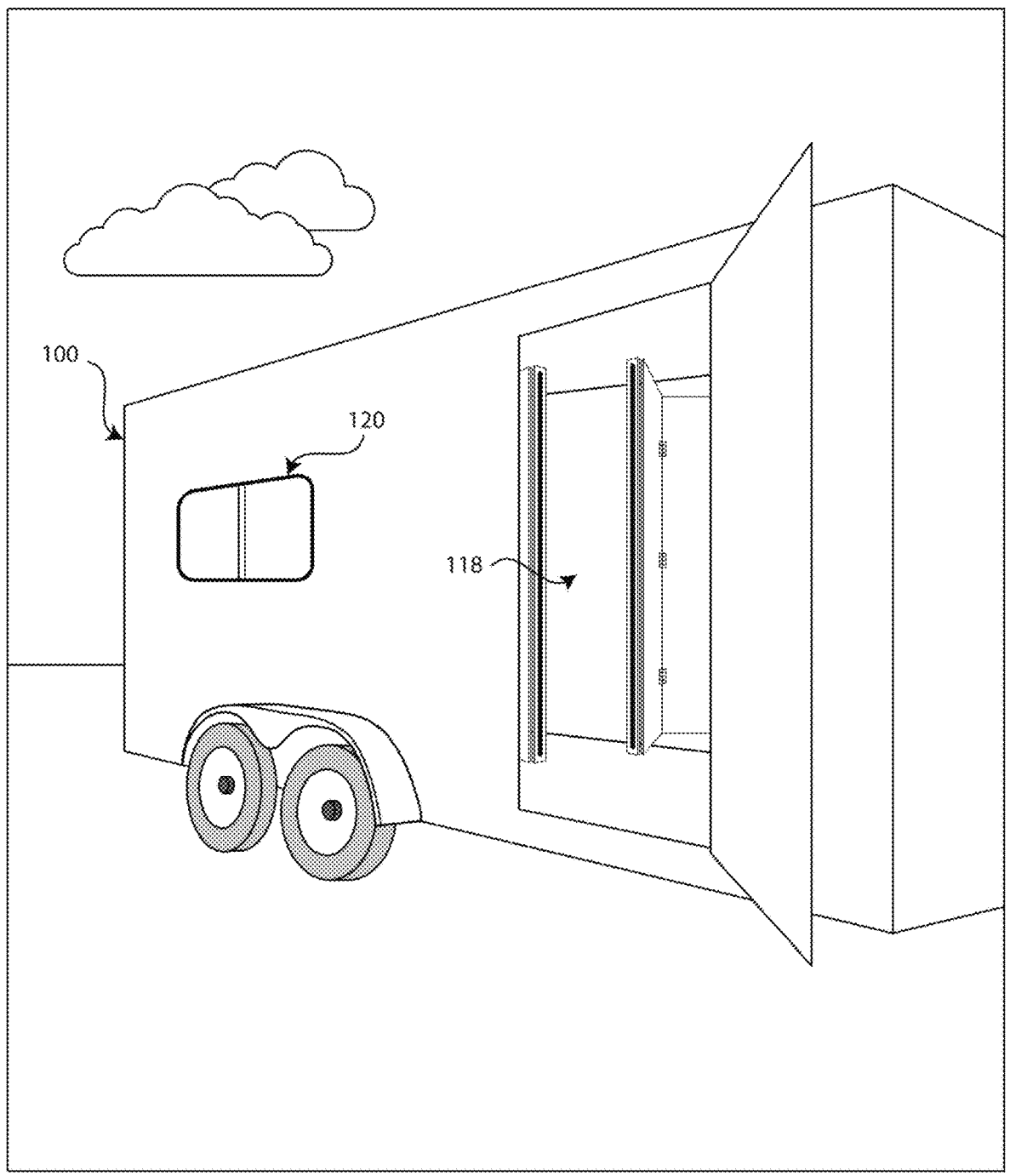
FIG. 6 illustrates an example mobile studio according to embodiments of the present disclosure.

FIG. 6 illustrates an example mobile studio according to embodiments of the present disclosure. For the purposes of this disclosure, the mobile studio will be discussed as the example mobile studio 100 of FIG. 1A. FIG. 6 illustrates a perspective of an exterior side of a mobile studio 100. For example, the exterior side of the mobile studio 100 may correspond to the side of the mobile studio 100 illustrated from the interior in FIGS. 5A-5B (e.g., the door 118 illustrated in FIGS. 5A-5B may be the same door 118 illustrated in FIG. 6).

Figure 7:
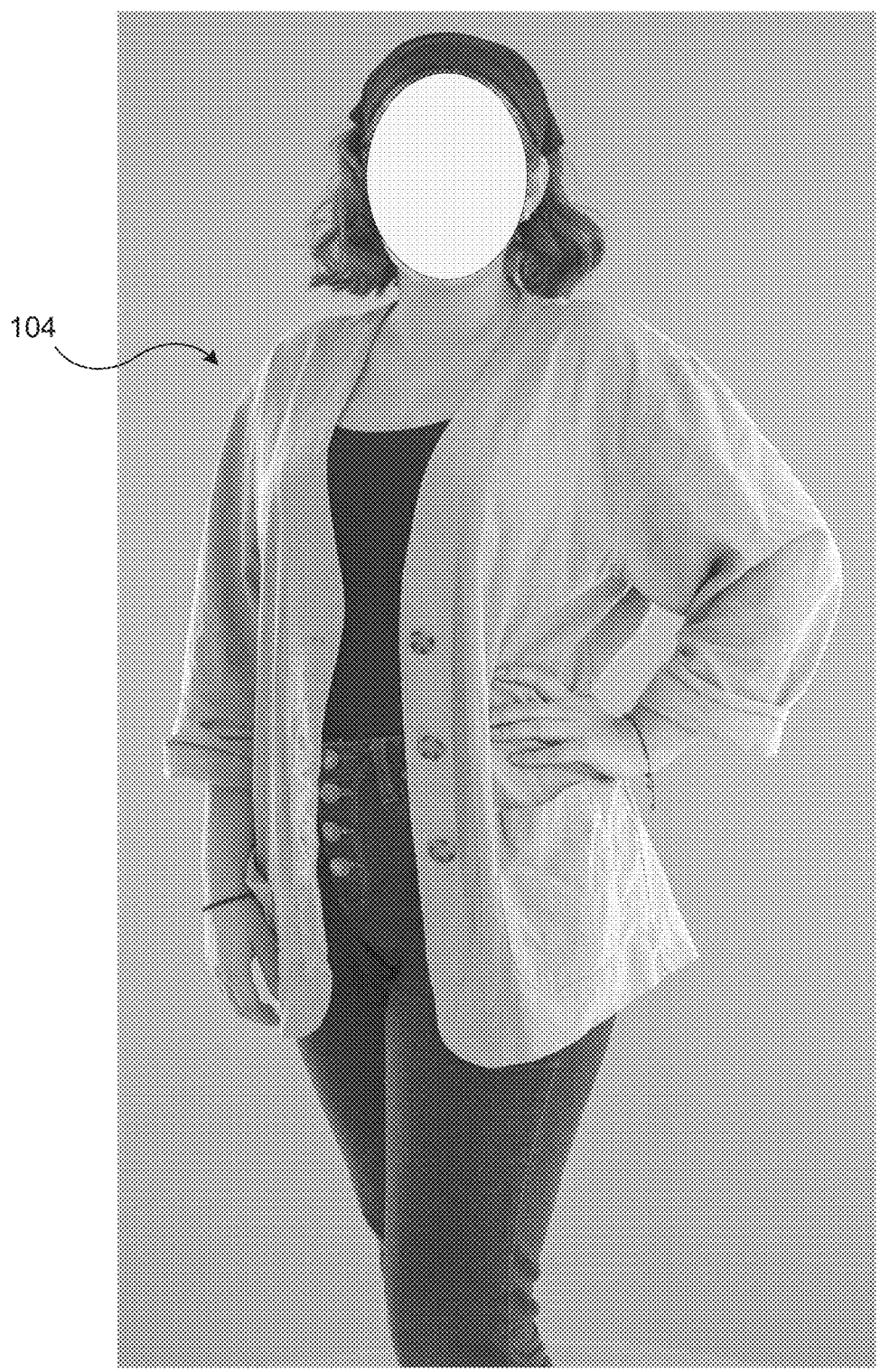
FIG. 7 illustrates an example of a subject in an example mobile studio according to embodiments of the present disclosure.

FIG. 7 illustrates an example of a subject 104 in an example mobile studio according to embodiments of the present disclosure. For the purposes of this disclosure, the mobile studio will be discussed as the example mobile studio 100 of FIG. 1A. The subject 104 of FIG. 7 is located within the subject area 102 of the mobile studio 100. In this embodiment, the subject 104 is lit from behind on either side by the backlighting elements 114 and is lit from the front on either side by two adjustable light panels 116. In this embodiment, the subject 104 is photographed against a solid colored background (e.g., a green background) in the subject area 102 for the purposes of chroma keying.

Figure 8:
FIG. 8 illustrates an example of a subject in an example mobile studio according to embodiments of the present disclosure.

FIG. 8 illustrates an example of a subject 104 in an example mobile studio according to embodiments of the present disclosure. For the purposes of this disclosure, the mobile studio will be discussed as the example mobile studio 100 of FIG. 1A. The subject 104 of FIG. 8, similar to the subject 104 of FIG. 7, is located within the subject area 102 of the mobile studio 100, is lit from behind on either side by the backlighting elements 114, and is lit from the front on either side by two adjustable light panels 116. In this embodiment, the subject 104 has been photographed against a solid colored background (e.g., a green background) in the subject area 102 for the purposes of chroma keying, and chroma keying has been applied to insert a background behind the subject 104 with lighting that matches the lighting of the subject 104. In some embodiments, the lighting applied to the subject 104 using the adjustable light panels 116 may be calibrated to match lighting in a pre-existing background photograph that will be inserted behind the subject 104 using chroma keying to generate the final product photograph.

Figure 9A:
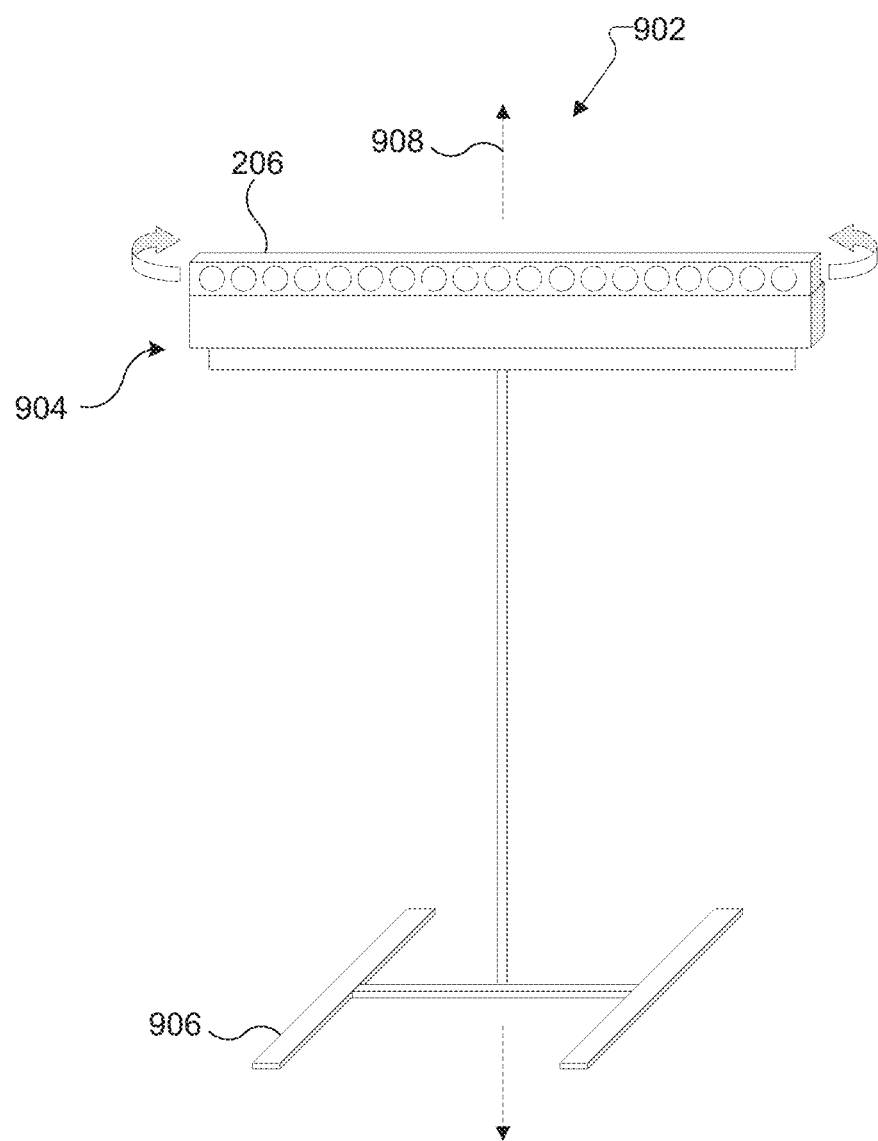
FIGS. 9A-9B illustrate an alternative example adjustable light panel according to embodiments of the present disclosure.
Figure 9B:
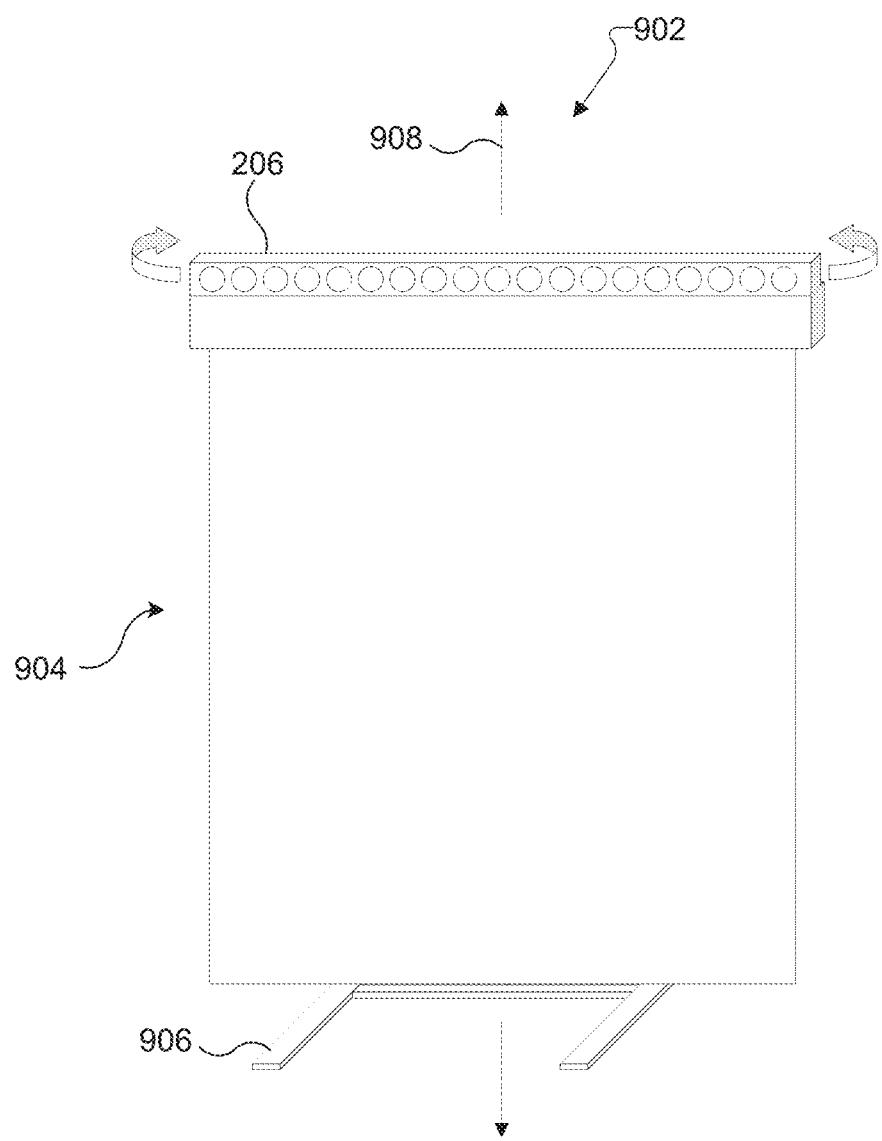

FIGS. 9A-9B illustrate an alternative example adjustable light panel 902 according to embodiments of the present disclosure. The adjustable light panel 902 may be comprised of a retractable (or collapsible) panel 904 and a light element (or light array) 206, which may be similar to the light element 206 of the adjustable light panels 116 disclosed above. The adjustable light panel 902 may be portable, and may be used in any environment (e.g., in a mobile studio such as mobile studio 100, in a permanent studio, in an outdoor environment, etc.).

In FIG. 9A, the adjustable light panel 902 is illustrated with the retractable panel 904 in a retracted position. The panel may be further collapsed from this position for portability (for example, the arms and legs of the panel may be collapsed). In some embodiments, the portion of the adjustable light panel 902 into which the retractable panel 904 retracts can be considered one section of the adjustable light panel 902, and the light element 206 can be attached to a separate section of the adjustable light panel 902.

In FIG. 9B, the adjustable light panel 902 is illustrated with the retractable panel 904 in an extended position. In this position, the panel may be used as a light reflector, flag, or backdrop for a subject (such as subject 104). For example, the retractable panel 904 may be painted with a reflective pigment (e.g., white) for use as a reflector, with an absorptive pigment (e.g., black) for use as a flag, or with another color (e.g., green) for use in chroma keying. Furthermore, the retractable panel 904 may be colored differently on each side for different purposes. For example, similar to the adjustable light panels 116 disclosed above, the adjustable light panel 902 could be placed between a photographer area 106 and a subject area 102 of a mobile studio 100 without blocking line-of-sight from a camera 108 to a subject 104, and the side of the retractable panel 904 facing the photographer area 106 could be painted black to avoid reflecting light towards the camera 108 while the opposite side of the retractable panel 904 (facing the subject area 102) could be painted black to reflect light towards the subject 104.

The adjustable light panel 902 may be placed freely around an environment, allowing for the light element 206 to be directed towards a subject 104 from any direction, thus providing a wide range of lighting options. For example, the adjustable light panel 902 may include a support structure 906 (e.g., feet) that allow the adjustable light panel 902 to be freestanding. In some embodiments, the light element 206 may be configured to rotate independently of the retractable panel 904 within a plane that is parallel to the ground (i.e., to rotate about an axis 908, which may also be an axis along with the retractable panel 904 retracts and extends), as indicated by the arrows illustrated in FIGS. 9A and 9B. By adjusting the angle of the light element 206 relative to the retractable panel 904, additional lighting effects may be achieved (for example, by positioning the adjustable light panel 902 near another, immobile reflective surface such as a wall of a studio, and rotating the light element 206 to take advantage of the angle of reflection from both the retractable panel 904 and the other reflective surface).

Although FIGS. 9A-9B illustrate one example of an adjustable light panel 902, various changes may be made to FIGS. 9A-9B. For example, the retractable panel 904 could be any other suitable retractable panel design (e.g., the retractable panel 904 could retract into a portion of the apparatus that is located opposite the light element 206).

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A modular photography system, comprising:
   a first compartment configured to receive a subject to be photographed;
   a second compartment adjacent the first compartment and configured to contain a camera, the first and second compartments sharing one pair of sidewalls;
   a divider disposed between the first and second compartments, the divider including:
      first and second adjustable panels, the first adjustable panel disposed on one of the pair of sidewalls and the second adjustable panel disposed on the other of the pair of sidewalls,
      the first and second adjustable panels being movable with respect to their associated sidewall such that an edge of each of the first and second adjustable panels that is distal from the associated sidewall can move toward and away from the edge of the other of the first and second adjustable panels to create an adjustable opening therebetween,
   the adjustable opening being adjustable to block or reflect light that travels from the first compartment toward the camera when the subject is disposed in the first compartment; and
      first and second light arrays disposed on the edges of the first and second adjustable panels, respectively, proximate the adjustable opening and directed toward the first compartment, such that the first and second light arrays illuminate the subject when the subject is disposed in the first compartment; and
   first and second backlight arrays disposed in the first compartment distal from the adjustable opening and adjacent to opposite ones of the pair of sidewalls.

2. The modular photography system of claim 1, wherein the first and second light arrays disposed on the edges of the first and second adjustable panels are configured to rotate about an axis perpendicular to a floor of the first and second compartments with respect to the associated respective edge to allow adjustable lighting of the subject when the subject is disposed in the first compartment.

* * * * *